United States Patent
Gessner et al.

(10) Patent No.: US 8,653,206 B2
(45) Date of Patent: Feb. 18, 2014

(54) OPERATION OF MULTI-REACTOR POLYOLEFIN MANUFACTURING PROCESS

(75) Inventors: Mark A. Gessner, Houston, TX (US); Michel Promel, League City, TX (US)

(73) Assignee: INEOS USA LLC, Lisle, IL (US)

(*) Notice: Subject to any disclaimer, the term of this patent is extended or adjusted under 35 U.S.C. 154(b) by 0 days.

(21) Appl. No.: 13/596,942

(22) Filed: Aug. 28, 2012

(65) Prior Publication Data
US 2012/0322957 A1 Dec. 20, 2012

Related U.S. Application Data

(62) Division of application No. 12/653,775, filed on Dec. 17, 2009, now abandoned.

(51) Int. Cl.
*C08F 2/00* (2006.01)
*C08F 110/02* (2006.01)

(52) U.S. Cl.
USPC .................. 526/59; 526/60; 526/65; 526/352

(58) Field of Classification Search
USPC .................................. 526/59, 60, 65
See application file for complete search history.

(56) References Cited

U.S. PATENT DOCUMENTS

| 6,586,537 B2 * | 7/2003 | Marissal et al. ................. 526/70 |
| 2008/0214745 A1 * | 9/2008 | Walworth ......................... 526/65 |

FOREIGN PATENT DOCUMENTS

WO   WO 2005080441 A1 *  9/2005  ................ C08F 2/00

* cited by examiner

*Primary Examiner* — David Buttner
*Assistant Examiner* — Elizabeth Eng
(74) *Attorney, Agent, or Firm* — James J. Drake; INEOS USA LLC

(57) ABSTRACT

The invention relates to an improved process for manufacturing an olefin polymer composition, in particular polyethylene, that incorporates two or more reaction zones in an optimized configuration that ease product transitions and allows for improved reactor quality control.

8 Claims, 3 Drawing Sheets

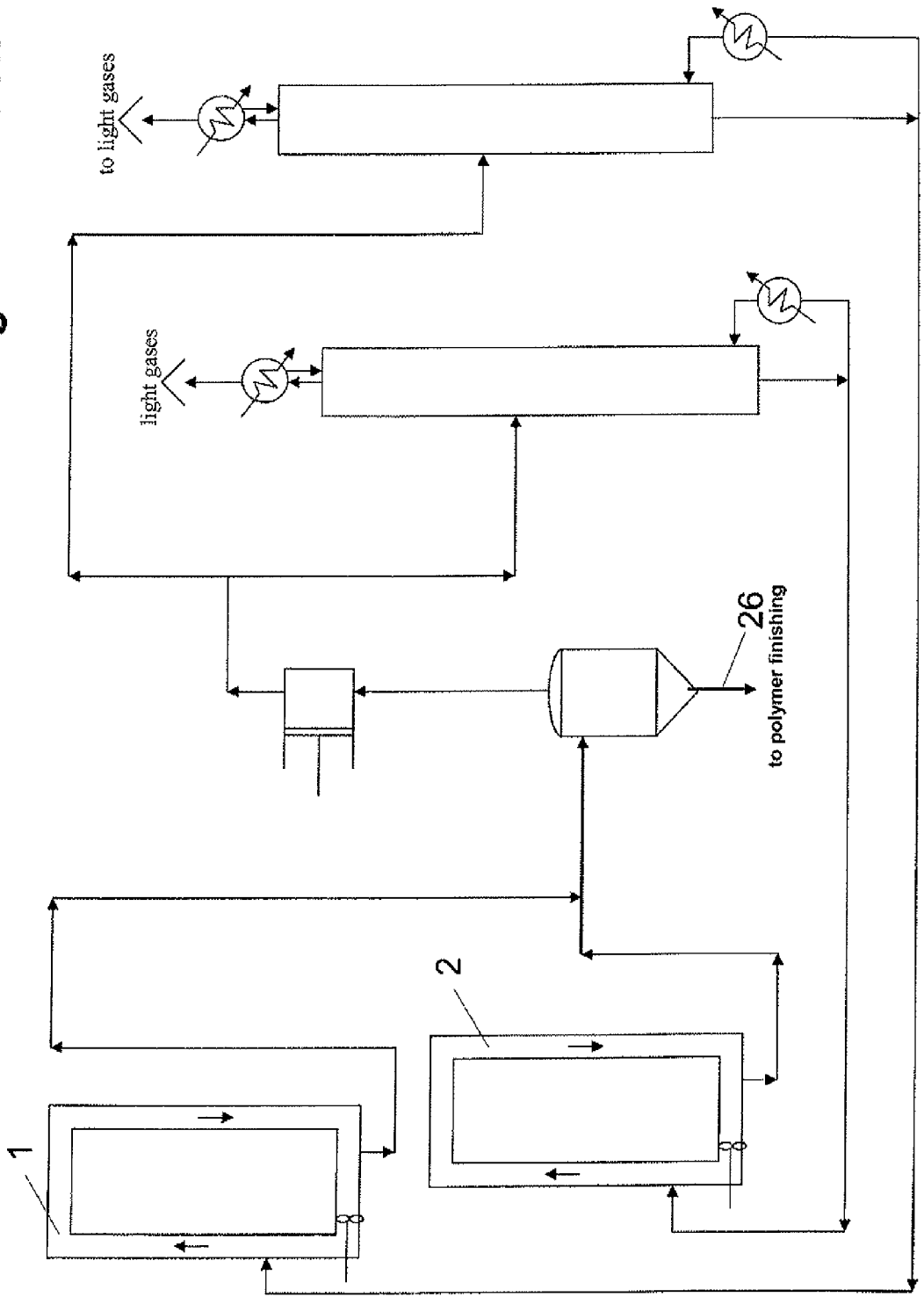
Figure 3: Example 4, process not according to invention

OPERATION OF MULTI-REACTOR POLYOLEFIN MANUFACTURING PROCESS

CROSS REFERENCE TO RELATED APPLICATION

This application claims the benefit of U.S. Ser. No. 12/653,775, filed Dec. 17, 2009, entitled "OPERATION OF MULTI-REACTOR POLYOLEFIN MANUFACTURING PROCESS".

BACKGROUND OF THE INVENTION

1. Field of the Invention

The invention relates to an improved process for manufacturing an olefin polymer composition, in particular polyethylene, that incorporates two or more reaction zones in an optimized configuration that improves product transitions and provides improved reactor quality control.

2. Description of the Prior Art

The general use of two reactors in series to manufacture an olefin polymer composition is described in the prior art and further advanced by U.S. Pat. No. 6,586,537, the disclosure of which is incorporated herein by reference in its entirety. In the '537 patent, a process is described that is suitable for production of olefinic polymer grades including ethylene polymer compositions comprising a polymer (A) and a polymer (B) having differing comonomer content and differing molecular mass. Such polymer grades are referred to in the industry as "bimodal" or "multimodal" grades. The use of two reactors in series to produce bimodal PE grades and their specific advantages are disclosed in U.S. Pat. No. 6,225,421 (Solvay Polyolefins), the disclosure of which is incorporated herein by reference in its entirety. The use of an intermediate-pressure light-gas removal system between two reaction zones that makes use of a fractionator is disclosed in WO 2006/015807, the disclosure of which is incorporated herein by reference.

General polymer sampling systems are well known and applied in the art, for example, U.S. Pat. Nos. 3,556,730, 4,469,853, 6,037,184, and 6,042,790, as well as WO/05080441.

In the multi-reactor systems disclosed in the prior art, the optimization of transitions between bimodal and monomodal products and methods by which the first reactor might be sampled and analyzed for quality control are neither taught nor suggested.

The present invention provides an optimized process which can be used for the manufacture of bimodal or monomodal grades using a wide range of catalysts, including Ziegler or chromium catalysts that overcomes the deficiencies of the prior art systems.

BRIEF DESCRIPTION OF THE DRAWINGS

FIG. 3 is a schematic showing a process not according to the invention which is discussed in Example 4.

SUMMARY OF THE INVENTION

Figure 1:
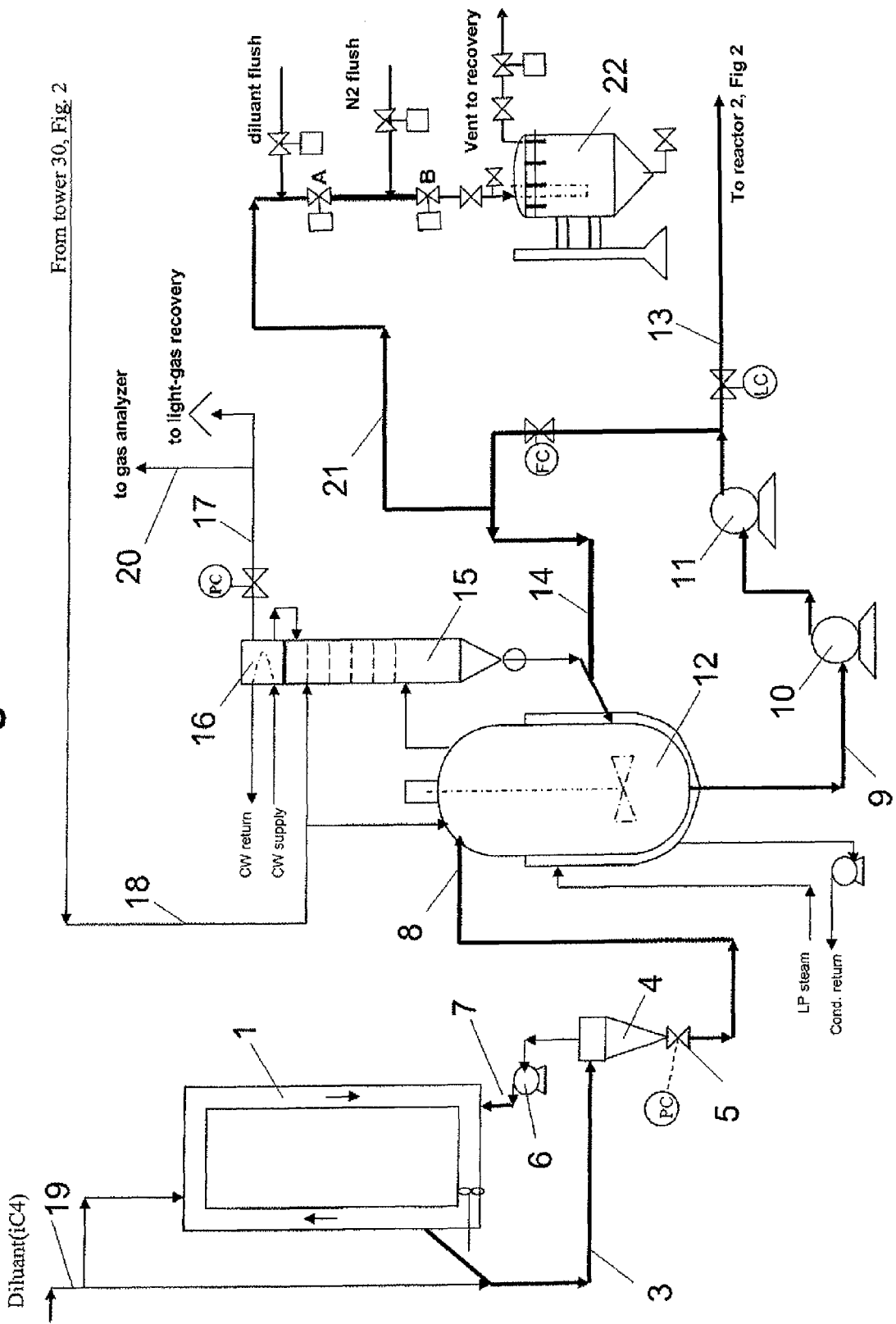
FIG. 1 is a schematic showing the first reaction zone, the letdown from the first reactor through the hydrocyclone to the intermediate-pressure light gas removal system, and the polymer (A) flake sampling system.

A process for manufacture of olefinic polymers in which light gases and polymer can be sampled between the reactors, and where the effluent from at least the second reactor is treated in two or more similar sized recycle columns, the configuration of such columns can be easily altered to a series or parallel operation for the manufacture of differentiated or non-differentiated polymers, respectively. In particular a transition between the production of a differentiated polymer and a non-differentiated can be achieved by transitioning polymerization reactors from production of a differentiated olefin polymer composition, e.g., ethylene, to production of a non-differentiated olefin polymer composition wherein the hydrogen to olefin ratio in each reactor is changed to the desired set-point for the non-differentiated resin prior to changing the co-monomer to olefin ratio in each reactor. According to the process of the invention, the recycle columns can be put in a series configuration for differentiated operation and easily converted through simple flow direction and feed location changes to a parallel configuration for non-differentiated operation.

The process of the invention relates to a process for manufacturing an olefin polymer composition in at least two reaction zones reactors that are configured in series, which reactors may be slurry reactors, and which may be elongated tubular closed loop reactors. The series reactors may be operated to produce polymers in each reactor with substantially the same conditions in each reactor (i.e., non-differentiated olefin polymer compositions, also known as "monomodal" polymers) or with differentiated conditions in each reactor (i.e., differentiated olefin polymer compositions, also known as "bimodal" polymers).

For the purposes of the described invention, differentiated reactor conditions are those where the comonomer content, molecular weight, and/or a melt flow index of the polymer produced in each reactor differs by at least 50%. For the purposes of this description non-differentiated reactor conditions are those where the comonomer content, molecular weight, and/or a melt flow index of the polymer produced in each reactor differ by less than 50%.

DETAILED DESCRIPTION OF PROCESS

According to the process of the invention, at least one olefin, e.g., ethylene, is continuously polymerized in a first reaction zone/reactor in the presence of a diluent (D), and a catalyst in order to produce a slurry or suspension (S) comprising the diluent (D) and solid particles of an olefin polymer, e.g., polyethylene. In the polymerization steps, it should be generally understood that, apart from one or more olefins and diluent, other compounds may be present, including cocatalysts (in particular alkyls) and other molecular weight control agents such as hydrogen.

The polymer suspension (S) may be withdrawn from any location of the reactor by any known means such as continuously or via settling legs or a combination of the continuous and discontinuous withdrawal. It is preferred that the withdrawal is taken from a location, e.g., in the loop of a loop reactor, where the reaction slurry is most concentrated and upstream of monomer and catalyst feeds, for example from the outside of an upturning bend of lower horizontal section of the loop. Alternatively the withdrawal may be taken from a location of the loop that is representative of the average solids concentration in the loop such as from a vertical, preferably upward flowing, section more than 10 to 20 pipe diameters downstream of a bend or obstacle.

A preferred embodiment, the withdrawn polymer suspension (S) is then sent to a concentrator, in which, on the one hand, a stream (F) comprising diluent (D) and fine particles of catalyst and/or polymer and, on the other hand, a concentrated suspension (CS) of particles of polymer (A) are formed and separated. In an alternate embodiment, this concentrator is omitted.

The stream (F) is drawn off of the concentrator and recycled to the first polymerization reactor under a controlled flow. The flow of stream (F) may be varied to control the average weight % of solids concentration of the polymer suspension (S) inside the first polymerization reactor while maintaining a higher solids concentration in the stream (CS).

The suspension of particles of polymer (A) is then introduced to a light-gas removal system where part of the slurry stream is vaporized. A preferred light-gas removal system comprises an agitated and steam-jacketed flash vessel operating at intermediate pressure (>50 and <300 pound-force per square inch gauge (psig)) lower than that of the first reactor, and a fractionation column which includes an overhead condenser that is directly connected to the vapor side of the aforementioned flash vessel.

The term "fractionation column" or "fractionator" refers to any fractionation device containing at least 2 theoretical stages. The fractionator contains 2 to 10 real trays, and can contain 4 to 8 real trays. Desired trays are those capable of handling some solids without plugging, such as "dual-flow" trays. In another embodiment of the process, the overhead condenser is a spiral-flow condenser that is directly attached to the top of the fractionation column.

A steam jacket on the flash vessel functions similarly to a tubular reboiler as it provides heat at the bottom of the fractionation column, but with the advantage of a stirred tank to collect the solids. The vapor moves up the column and most of the diluent and also any heavy comonomer, e.g. hexene, is condensed by the overhead condenser and falls as a liquid along with any scrubbed polyolefin fines down to the flash vessel where the solids suspension (CS') containing particles of polymer (A) is collected. Stream CS' typically has a solids concentration of between 30 wt % and 60 wt %, but is preferably controlled at around 45 to 50 wt % solids by addition of recycle diluent which enters the system directly to vessel or optionally to the upper stage(s) of the scrubber tower (to promote scrubbing out of fines during start-up). The process is able to use recycle diluent that contains heavy comonomer, e.g. isobutane containing hexene, (versus pure diluent, e.g. pure isobutane) which reduces the demand of pure diluent.

In a preferred light-gas removal system, most overhead vapors, free of polymer fines due to the scrubbing action of the liquid diluent stream moving down the column, are removed from the overhead of the columns and sent on to a recycle system for recovery. At least part of this stream is removed and sent on to an analytical device that is capable of measuring light gas, e.g. hydrogen and ethylene concentrations. This stream is polymer-free so no further filtering is required prior to entering the analytical device, e.g. a gas-chromatograph. In a preferred embodiment of the process the resulting analytical information is then used to control the concentration of at least one of the key reactants, e.g. hydrogen and/or ethylene, in the first reaction zone, by direct control of the quantity of the reactant(s) fed to the first reaction zone.

The suspension of particles of polymer (A) or CS' (with lowered concentrations of light gases in the liquid phase) is then pumped, using a centrifugal pump, preferably a series of open-impeller pumps, from the bottom of the intermediate-pressure flash vessel to a second polymerization zone. Stream CS' typically has a slurry concentration of at least 30 wt %, preferably 40 to 60 wt %, more preferably 45 to 55 wt % solids.

In a preferred embodiment of the process, at least part of this stream containing the suspension (CS') is recirculated back to the slurry within the flash vessel. Optionally, the injection means can provide further agitation in the vessel, and a portion of the recirculated suspension is removed to be treated so as to separate out a sample of the solid polymer particles for quality control analysis.

A preferred sample separation device contains a filter vessel into which a volume between two automated valves is filled, then dumped to the filter vessel at a lower pressure, the vaporized hydrocarbons are purged with an inert gas and removed, leaving a sample (or "flake") of the polymer (A) in the filter, which can be removed for analysis after manual opening of the filter vessel.

The capability to sample both the flake and the overhead gases in the first reactor zone is desirable for both differentiated and/or non-differentiated production and the transitions between differentiated and non-differentiated production (and vice-versa) are simplified by using the above light-gas removal and sampling systems.

The part of the (CS') stream not recirculated above is sent on to a subsequent polymerization reactor in which at least one olefin is polymerized in order to form an olefin polymer (B) and to produce a suspension (S') comprising the diluent (D) and particles of an olefin polymer composition comprising polymer (A) and polymer (B). Diluent, preferably diluent from the recycle system, is added (preferably in combination with fresh comonomer, e.g. hexene) to the second reactor in order to control the solids concentration.

As in the case of the upstream reactor, the polymer suspension (S') may be withdrawn from the second polymerization reactor using any known technique. It is preferred that the withdrawal is taken from a location, e.g., in the loop of the loop reactor, where the reaction slurry is most concentrated and upstream of monomer and catalyst feeds.

In a preferred embodiment the polymer suspension is continuously withdrawn via one or more letdown valves and the withdrawn slurry (S') is heated using an in-line slurry heater. Where multiple withdrawal lines are employed, it is preferred that each withdrawal line is provided with a dedicated slurry heater.

The outlet temperature of each of the parallel slurry heaters can be independently controlled, generally to be greater than 5° C., preferably greater than 10° C. above the dew point for sufficient time that the suspending diluent is essentially vaporized.

The withdrawn stream(s) S' are let down to one or more separation vessel(s) at a lower pressure than the reactor to separate vapor from the degassed polymer solids. Optionally, each withdrawal line may be provided with an independent parallel separation vessel. In one embodiment, the primary low pressure separation vessel is at less then 20 psig, and the degassed polymer is removed directly from this vessel.

Optionally, the main separation may be at a pressure such that the overhead vapor may be condensed against available cooling water (for instance at between 10° C. and 40° C.) and the condensed vapor pumped back to the reaction system. The product withdrawn from a high or medium pressure primary separator is then letdown continuously or intermittently to a low pressure separator or to a purge column operating at between 5 and 30 psig, preferably less than 20 psig. In this way, the solids let-down system can ensure reliable powder flow whilst minimizing vapor leakage. The final product is removed from the low pressure separator or purge bin.

The overhead hydrocarbon vapors from the above vessel(s) are compressed to at least 180 psig, and sent on to the separation system for hydrocarbon recovery and reuse. The purpose of a downstream separation system is to separate the light gases (e.g. ethylene) for removal and further treatment, while keeping most of the diluent (e.g. isobutane) and comonomer (e.g. hexene) for re-use in reactors. For bimodal grades the first reactor is a homopolymer or near homopolymer so special treatment is necessary (nearly complete separation of comonomer, e.g. hexene, from diluent, e.g. isobutane, so a pure diluent stream may be sent to first reactor).

A preferred embodiment of the process uses two similarly-sized columns that can be put in a series configuration for bimodal production (e.g. the comonomer hexene is separated out at the bottom of the first column, to be fed only to the second reactor) and easily convertible through simple flow-direction and feed-location changes to a parallel configuration for monomodal production (e.g. the comonomer hexene is not separated from the diluent and is fed to either reactor).

The term "olefin polymers" as used herein includes both the homopolymers of an olefin and the copolymers of an olefin, with one or more other olefins (or monomers) able to be copolymerized with the olefin. Possible olefins include the group of 1-olefins comprising from 2 to 12 carbon atoms, and in particular ethylene, propylene, butene, octene and hexene.

The diluent (D) may be any diluent that is liquid under the polymerization conditions and in which most of the polymer formed is insoluble under those conditions. The diluent is preferably an acyclic aliphatic hydrocarbon containing from 3 to 8 carbon atoms, and in particular may be selected from the group comprising propane, isobutane, pentane, and hexane. Isobutane is a particularly preferred diluent for use in the process of the invention.

In the polymerization zones, any catalyst allowing olefins to polymerize may be used. These may include catalysts of the Zeigler type, catalysts based on chromium or vanadium, metallocene catalysts, as well as those catalysts based on transition metals. A co-catalyst, which may be an aluminum alkyl compound, may also be added to the polymerization reactor(s).

For the purposes of the present invention, melt flow index MI2, respectively MI5, is understood to denote the melt flow indices measured according to ASTM Standard D 1238 (1986) at temperature of 190° C. and under a load of 2.16 kg, respectively 5 kg.

A preferred differentiated olefin polymer comprises a bimodal ethylene copolymer composition where from 30 to 70% of the total composition is a first block, preferably formed in the first reactor, and said first ethylene polymer block has a comonomer content ranging from 0 to 0.5 wt % with a melt flow index MI2 from about 5 to 1000 g/10 min, and where from 30 to 70% of the total composition is a second block, preferably formed in the second reactor, and said second block is a copolymer of hexene and ethylene having a melt flow index MI5 of 0.01 to 2 g/10 min and a hexene-1 content of 1 to 6 wt %. In a preferred non-differentiated process, the materials made in the first and second reaction zones have the same, or nearly the same, melt flow index and comonomer content.

In a process having differentiated reactor conditions, either the low molecular weight (high melt-flow index) or high molecular weight material (low melt-flow index) polymer may be made in the first reactor. It is preferred that the lower molecular weight polymer is made in the first reactor. Hydrogen concentration within the reactor is used to control molecular weight in the low molecular weight reactor. This low molecular weight product is preferably a homopolymer or near homopolymer, preferably containing less then 0.1 wt % comonomer.

Reliable control, particularly start-up, rate-changing and grade-changing, of multi-reactor processes requires timely and accurate information related to polymerization conditions, and associated product formed, for each reactor. This requires the ability to accurately and systematically predict and/or representatively sample both reaction fluids and polymer products whilst minimizing sampling and analysis lag-time.

In a preferred embodiment of the process a sample stream is taken from a slurry containing particles of polymer (A), via a sample filter, using a controlled sequence of automated on-off valves that perform at least the following steps:

a). part of the slurry is collected in a volume between two valves, A and B b). the valve B opens, sending the suspension to a sample filter that is vented to a pressure<20 psig.

c). a sample of polymer (A) is caught in the filter d). the diluent (D) and other hydrocarbons are vaporized and removed e). after the sample filter vessel is flushed with inert gas and completely depressured, the degassed sample of polymer (A) is removed for analysis.

In an alternative embodiment the sample containing particles of polymer (A) is may be taken upstream of the slurry concentrator or withdrawn directly from the first reactor. In another alternative embodiment the sample is taken from the concentrated slurry downstream of the concentrator.

In a preferred process according to the invention, the analysis of the polymer (A) is used to control one or more conditions in the first reactor, some examples being reagent concentrations, preferably hydrogen and/or monomer, concentrations, or reactor temperature, that are used for quality control of the final product.

A preferred process according to the invention uses two similarly-sized columns that can be put in a series configuration for differentiated operation (e.g., the hexene is separated out at the bottom of the first column, to be fed only to the high molecular weight polymerization reactor) and easily convertible through simple flow direction and feed location changes to a parallel configuration for non-differentiated operation (e.g. the hexene is not separated from the diluent and is fed to either or both reactors).

In one embodiment of the process, suitable for production of non-differentiated polymers, the recycle columns are lined up independently and in parallel with part of the flow from the separation vessel(s) that is compressed in compressor(s) is introduced into a recycle column at a feed point at a stage in the middle of the column. The rest of the flow is sent to a recycle column also at a feed point at a stage in the middle of the column. From the bottom of the column the recovered diluent, e.g. isobutane, and comonomer, e.g. hexene, is sent to the second reactor and to the intermediate flash vessel or to the first polymerization reaction zone/reactor. The light overhead gases containing unreacted monomer, e.g. ethylene, are removed from the top of both columns for further external treatment and recovery.

In an alternate embodiment of the process, suitable for the production of differentiated resins, all of the flow from the separation vessels(s) that is compressed in compressor(s) is sent to a recycle column, which is the first column in the series configuration, and is introduced at a feed stage that lies within the bottom third of all the column stages. In the preferred embodiment for differentiated production, all of the comonomer, e.g. hexene, and part of the diluent, e.g. isobutane, is collected in the bottom of the column and sent to the second reactor (typically the high molecular weight reactor), and optionally, to the flash vessel of the light-gas removal system.

The unreacted hydrogen, some of the unreacted ethylene monomer, and other light gases exit out the top of the condenser for the recycle column and are removed for further external treatment and recovery. The rest of the diluent, e.g. isobutane, along with the rest of the ethylene monomer is removed via a vapor draw-off from a stage close to the top of the first recycle column and is introduced to a second recycle column at a middle feed stage.

The second recycle column functions to remove the rest of the unreacted monomer, e.g. ethylene, which leaves from the top of the overhead condenser and is removed for further external treatment and recovery. Most of the pure diluent, e.g. isobutane, leaves the bottom of the second recycle column for use in the low molecular weight reactor, which is preferably the first reactor. Optionally, part of this isobutane may also be sent to the flash vessel of the light gas removal system. The vapor draw-off flowrate (between the columns) may be varied to control the level of diluent, e.g. isobutane, in the recycle storage vessel associated with the low molecular weight reactor (i.e. isobutane diluent from the bottom of the second recycle column). The level of diluent, e.g. isobutane, plus comonomer, e.g. hexene, in the recycle vessel associated with the high molecular weight reactor may be controlled in the same method as typically used for individual parallel operation (i.e., addition of external diluent, e.g. isobutane, to compensate for the diluent that leaves with the ethylene at the overhead of the column). The bottoms temperature of each column is typically controlled by varying the steam flow to the reboiler.

Typically the melt-flow index of the polymerized olefins is controlled by manipulation of the temperature and/or hydrogen to ethylene concentration ratio in the reactor(s). Product density control is typically controlled by manipulation of the hexene to ethylene concentration in the reactor(s). For the differentiated and non-differentiated grades of products ethylene concentration is preferably kept constant in each reactor (although a differentiated grade may have a different ethylene concentration setpoint than the non-differentiated product), the melt-flow index is ultimately controlled by the hydrogen feed to the reactor and the density is ultimately controlled by the comonomer (e.g. hexene) fed to the reactor.

For a process according to the invention, the transition from differentiated to non-differentiated grades can be accomplished without any stoppage of catalyst flow and involves the transition of conditions in the first reactor (i.e., temperature, pressure, hydrogen flows, hexene flow), conditions in the light-gas removal system, the flash vessels (i.e. pressure), conditions in the second reactor (i.e. hydrogen flow, pressure), as well as simple pipe valve changes to convert from series operation to parallel operation. An exemplary process for the transition is as follows:

1) change hydrogen flow to that required for new product in the first reactor, 2) slowly increase light-gas removal system pressure (minimum 5 psig per 20 minutes, maximum 20 psig per 20 minutes), and at the same time increase the second reactor pressure at similar rate to maintain a constant positive pressure differential (at least 10 psi) between the discharge of the first reactor and the second reactor.

3) When the correct second reactor pressure for the non-differentiated product is achieved, the hydrogen flow is changed to that required to achieve the desired melt-flow index for the polymerized olefin in the second reactor.

4) Valve changes are made to put the recycle columns in parallel operation.

5) Comonomer flow rate is adjusted in both reactors to that of non-differentiated product, controlling final product density.

6) The ethylene concentration for both reactors can be slowly adjusted to the new setpoint for the non-differentiated product by adjusting ethylene flowrate in each reactor (preferably at a rate of change between 0.1% per 20 minutes, to 0.5% per 20 minutes).

The process of the invention results in a transition that can be completed in from about 8 to about 12 hours, and possibly from about 8 to about 10 hours. For such transitions it is preferred to sample the polymer product from each reaction zone at a frequency preferably between 2 to 4 hours. Following this preferred transition order, it is possible to avoid pluggage or gas capping on either reactor, resulting in faster transition times without having to stop the ongoing polymerization process.

Example 1

Figure 2:
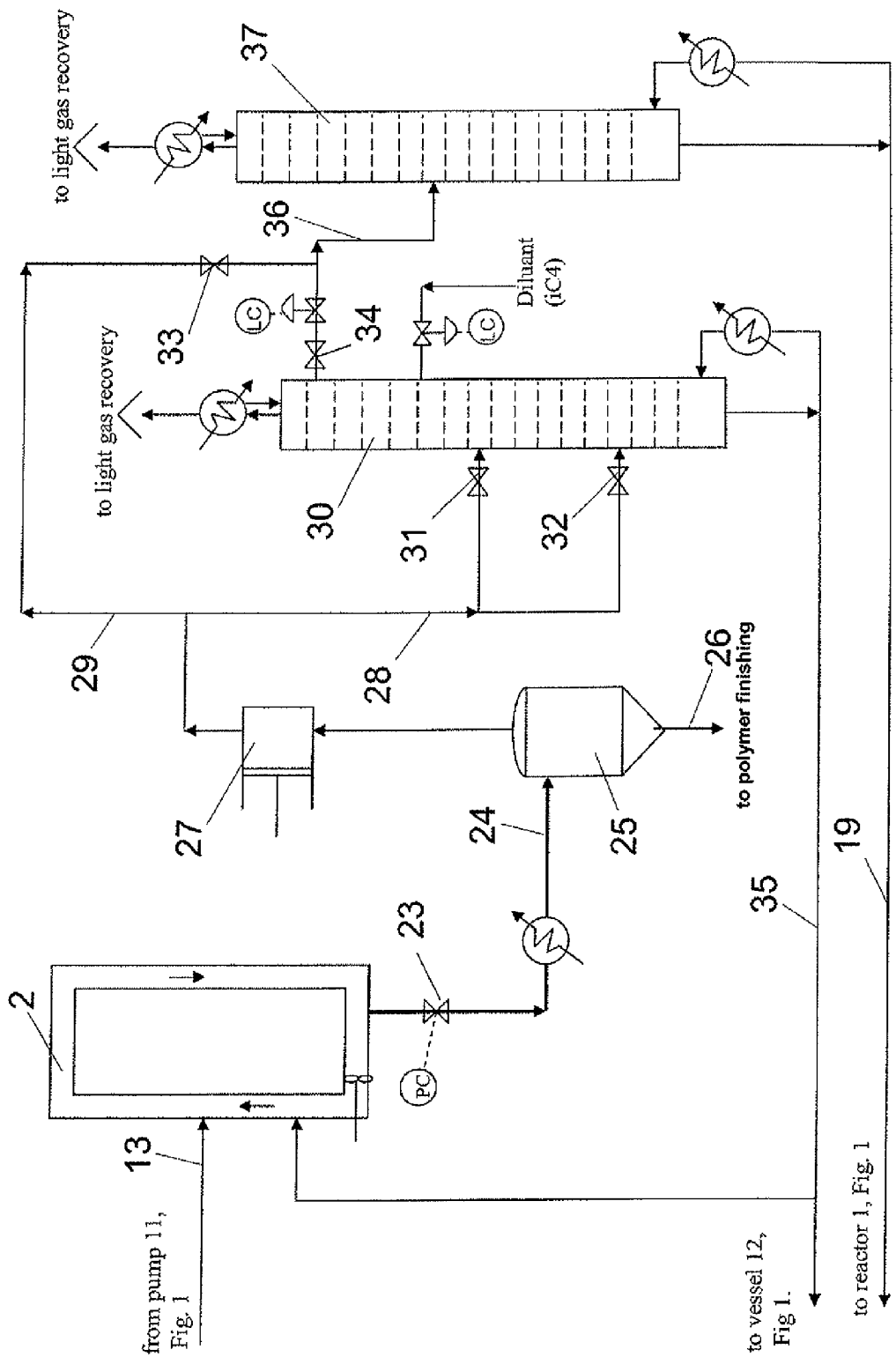
FIG. 2 is a schematic showing the second reaction zone, the letdown from the second reactor to the flash vessel(s), the compression of the hydrocarbon gases, and the diluent and comonomer recovery system

Production of a differentiated, bimodal-grade, polymer was carried out using the inventive process described herein and the plant described in FIGS. 1-2. Ethylene was continuously polymerized in the first loop reactor 1 which was charged with isobutane, by means of a Ziegler-type catalyst so as to form a suspension comprising about 35% by weight of particles of a low molecular weight ethylene homopolymer. The temperature in the reactor 1 was about 205 F, and the pressure was about 550 psig. The reactor 9 was fed continuously with ethylene at a rate of 10 kpph. Some of the suspension of polymer particles formed in the reactor 1 was continuously withdrawn via the line 3 at the rate of 51 kpph. The reactor 1 was fed isobutane diluent recycled from the distillation column 37 supplied via line 19 at a total rate of 8 kpph. The suspension (S) comprised approximately 35% by weight of polymer particles and was sent continuously to the hydrocyclone separator 4. The operation of the hydrocyclone separator was controlled by means of the pump 6 speed control and the control valve 5 so as to obtain a stream (F) leaving the hydrocyclone and returning to the reactor 1 via the line 7 at the rate of 32 kpph, and a concentrated suspension (CS) leaving the hydrocyclone via the line 8 at a rate of 18 kpph. The suspension (CS) comprised of 56% by weight of polymer particles, and the liquid component flows were 8 kpph of isobutane, 126 pph of ethylene, and 4.1 pph of hydrogen. The suspension (CS) was sent through the letdown valve 5 via line 8 to the vessel 12 in which the pressure was about 140 psig. Isobutane diluent and hexene recycled from the distillation column 30 via the line 18 was introduced to vessel 12 at a flowrate of 2 kpph. The resulting polymer suspension collected in the bottom of vessel 12 comprised about 50% by weight of polymer particles. The temperature of the polymer suspension collected in vessel 12 was about 157° F. The steam flow used in the jacket of vessel 12 was at 1200 pph. The light gases from the top of vessel 12 travelled up through the fractionation column 15 where the gases not condensed by the overhead condenser 16 were removed via line 17 part of which was sent via line 20 to a gas chromatograph analyzer for measurements used in determining the reactor 1 ethylene and hydrogen compositions. The temperature of the overhead gases leaving the condenser 16 was 92° F. The total concentration by weight of $H_2$ remaining in the suspension collected in vessel 12 was 0.00058% by weight. The flowrates of isobutane diluent and ethylene leaving with the overhead light gas stream were 299 pph and 108 pph, respectively.

The degassed suspension was pumped from vessel 12 via pumps 10 and 11 and part of this stream was returned to the vessel 12 via line 14, while the rest of the stream was introduced in the reactor 2 loop via line 13 at a flowrate of about 20 kpph. Part of the recirculation polymer suspension upstream of line 14 was removed periodically and sent to the polymer sample filter 22 via line 21 from where a sample of polymer (A) was manually removed every 2 to 4 hours and its properties measured for quality control purposes.

The loop reactor 2 was continuously fed with additional ethylene and hexene at a rate of 10 kpph, and 556 pph, respectively. A stream of isobutane diluent and hexene recovered from distillation column 30 (supplied via the line 35), was also added directly to the reactor 2 at a rate of 14 kpph. The pressure and temperature conditions in reactor 2 were 185 F and 425 psig, respectively. The hexene concentration in the reactor 2 was approximately 5.8% by weight. Some of the suspension of particles of the polymer composition was continuously drawn off from the reactor 2 via the line 24 and the control valve 23. The total flow rate of withdrawn suspension was 44 kpph, and this suspension comprised about 45% by weight of particles of a polymer composition comprising an ethylene homopolymer and an ethylene/hexene copolymer.

The withdrawn suspension was sent through a slurry heater where it is heated up to 145° F. prior to entering the flash vessel 26 where the polymer particles were separated out. The pressure of the flash vessel 26 was 7 psig. The total rate of the polymer composition stream leaving the flash vessel via line 26 was 20 kpph. The combined overhead gases composed essentially of isobutane diluent, hexene, and ethylene were sent on to the compressor 27. The compressed gases where then fed via line 28 and valve 32 into a lower stage of column 30, which was operated at a pressure of 210 psig and with the temperature at the bottoms of 195 F. The valves 31 and 33 were closed.

From the bottom of column 30, a stream comprised of isobutane and hexene was sent on via line 35 for re-use in the reactor 2 and also the vessel 12. The flowrate through line 35 was 16 kpph. Light gases, ethylene and some isobutane were removed from the condenser on top of column 30, while a vapor stream was withdrawn from a top tray of column 30 via line 36. This vapor stream comprised essentially of isobutane and ethylene was fed to the column 37 at a flowrate of about 9 kpph. The column 37 was operated at 205 psig with a bottoms temperature of 187° F. Ethylene and some isobutane were removed from the condenser on top of column 37. From the bottom of column 37, a stream comprised of essentially isobutane was sent via line 19 for re-use in the reactor 1. The flowrate through line 19 was 8 kpph. The total flowrate of the product bimodal polymer was about 20 kpph. The first reactor product was a homopolymer with essentially no comonomer content and an MI2 of around 600 g/10 min. The product leaving the second reactor (final product) had a comonomer (hexene) content of 1.5 wgt % and an average MI5 of 0.30. The product made in $2^{nd}$ reactor ($2^{nd}$ bloc) high had an estimated MI5 of 0.03 g/10 min and a comonomer content of 3.0 wt %

Example 2

Production of a non-differentiated, monomodal-grade copolymer was carried out using the process described in the invention and the plant described in FIGS. 1-2. The same recycle columns were used as in the previous example, but they were put in the individual parallel configuration. Ethylene was continuously polymerized in the first loop reactor 1 which was charged with isobutane, by means of a Ziegler-type catalyst so as to form a suspension comprising about 39% by weight of particles of an ethylene copolymer. The temperature in the reactor 1 was about 185° F., and the pressure was about 500 psig. The reactor 1 was fed continuously with ethylene at a rate of 10 kpph, hexene at a rate of 320 pph, and hydrogen at a rate of 1.2 pph. The hexene concentration in the reactor 1 was approximately 5.8% by weight. Some of the suspension of polymer particles formed in the reactor 1 was continuously withdrawn via the line 3 at the rate of 51 kpph. The reactor 1 was fed isobutane diluent and hexene recycled from the distillation column 37 supplied via line 19 at a total rate of about 8 kpph. The suspension (S) comprised approximately 39% by weight of polymer particles and was sent continuously to the hydrocyclone separator 4. The operation of the hydrocyclone separator was controlled by means of the pump 6 speed control and the control valve 5 so as to obtain a stream (F) leaving the hydrocyclone and returning to the reactor 1 via the line 7 at the rate of 32 kpph, and a concentrated suspension (CS) leaving the hydrocyclone via the line 8 at a rate of 18 kpph. The concentrated suspension (CS) comprised of 56% by weight of polymer particles, and the liquid component flows were 8 kpph of isobutane, 168 pph of ethylene, 504 pph of hexene, and 0.6 pph of hydrogen. The suspension (CS) was sent through the letdown valve 5 via line 8 to the vessel 12 in which the pressure was about 190 psig. Isobutane diluent and hexene recycled from the distillation column 30 via the line 18 was introduced to vessel 17 at a flowrate of 2 kpph. The resulting polymer suspension collected in the bottom of vessel 12 comprised about 50% by weight of polymer particles. The temperature of the polymer suspension collected in vessel 12 was about 178° F. The steam flow to the jacket of vessel 12 was 1200 pph. The light gases from the top of vessel 12 travelled up through the fractionation column 15 where the gases not condensed by the overhead condenser 16 were removed via line 17 part of which was sent on via line 20 to a gas chromatograph analyzer for measurements used in determining the reactor 1 ethylene and hydrogen compositions. The temperature of the overhead gases leaving the condenser 16 was 90° F. The total concentration by weight of ethylene remaining in the suspension collected in vessel 12 was 0.36% by weight. The flowrates of isobutane diluent and ethylene leaving with the overhead light gas stream were 123 pph and 109 pph, respectively.

The degassed suspension was pumped from vessel 12 via pumps 10 and 11 and part of this stream was returned to the vessel 12 via line 14, while the rest of the stream was introduced in the reactor 2 loop via line 13 at a flowrate of about 20 kpph. Part of the recirculation polymer suspension upstream of line 14 was removed periodically and sent to the polymer sample filter 22 via line 21 from where a sample of polymer (A) was manually removed every 2 to 4 hours and its properties measured for quality control purposes.

The loop reactor 2 was continuously fed with additional ethylene, hexene, and hydrogen at a rate of 10 kpph, and 320 pph, and 1.2 pph respectively. A stream of isobutane diluent and hexene recovered from distillation column 30 (supplied via the line 35), is also added directly to the reactor 2 at a rate of 14 kpph. The pressure and temperature conditions in reactor 2 were 185° F. and 490 psig, respectively. The hexene concentration in the reactor 2 was approximately 5.8% by weight. Some of the suspension of particles of the polymer composition was continuously drawn off from the reactor 2 via the line 24 and the control valve 23. The total flow rate of withdrawn suspension was 44 kpph, and this suspension comprised about 45% by weight of particles of a copolymer.

The withdrawn suspension was sent through a slurry heater where it was heated up to 145° F. prior to entering the flash vessel 26 where the polymer particles were separated out. The pressure of the flash vessel 26 was 7 psig. The total rate of the polymer composition stream leaving the flash vessel via line 26 was 20 kkph. The combined overhead gases composed essentially of isobutane diluent, hexene, and ethylene were sent on to the compressor 27. The overhead gases were split downstream of the compressor and part sent via line 28 and valve 31 to a middle stage of distillation column 30, and the rest sent via line 29 and valve 33 to a middle stage of distillation column 37. The valves 32 and 34 were closed.

For the parallel configuration of this example, both columns 30 and 37 operated at a pressure of 205 psig, and with the temperature at the bottoms of 192° F. Light gases, ethylene and some isobutane were removed from the condensers on top of each of the columns 30 and 37. From the bottom of column 30, a stream comprised of isobutane and hexene was sent on via line 35 for re-use in the reactor 2 and also the vessel 12. The flowrate through line 35 was 16 kpph. From the bottom of column 37, a stream comprised of isobutane and hexene was sent via line 19 for re-use in the reactor 1. The flowrate through line 19 was 8 kpph.

The total flowrate of the product monomodal copolymer was about 20 kpph. For this non-differentiated monomodal grade, essentially the same copolymer was produced in each reactor zone (and the final product). The average MI2 was 3.5 and the comonomer content was 25 lb/klb or 2.5 wt %.

Examples 1 and 2 illustrate that with only a simple change in flow configuration around the distillation columns, the process according to the invention enables the production of a range of products, including differentiated "bimodal" grades and non-differentiated "monomodal" grades.

Example 3

For this example, the production of a differentiated, bimodal-grade, polymer was repeated using the same process and conditions described in Example 1, then a product transition to a non-differentiated, monomodal-grade polymer (using the same conditions and process as described in Example 2) was completed. The transition from bimodal to monomodal grade was accomplished without any stoppage of catalyst flow and involved the simple transition of conditions in reactor 1 (i.e. temperature from 205° F. to 185° F., pressure from 550 psig to 500 psig, decreased hydrogen flow, increased hexene flow), conditions in the light-gas removal system, vessels 12 and 15 (i.e. pressure from 140 psig to 190 psig), conditions in reactor 2 (i.e. increase of hydrogen flow, increase of pressure from 425 to 490 psig), as well as simple pipe valve changes to convert from series operation of the recycle towers (30 and 37) as described in example 1, to the parallel operation of independent towers as described in example 3. The catalyst flowrate is adjusted slightly to essentially provide a constant production rate. The total time for the complete product transition of this example was 10 to 12 hours.

Example 4

For comparison to a prior art process, the product change from the differentiated "bimodal-grade" polymer to the non-differentiated "monomodal-grade" polymer as described in example 3 was repeated, but with the resulting non differentiated "monomodal-grade" polymer being produced in individual parallel reactors as per the typical process, not in the series configuration with the light-gas removal system still operating as per example 3. The process configuration for this example, not according to the invention, is shown schematically in FIG. 3.

The final configuration for the monomodal production of this example, had reactors 1 and 2 with the same reactor conditions as per Example 3 (pressure 500 psig, temperature 185° F.), but with the polymer suspension from both reactors withdrawn directly to a slurry heater and on the low-pressure flash vessel (or parallel vessels) 25. The final configuration of the recycle towers was identical to example 3 (i.e. towers in parallel). In this example; however, the hydrocyclone vessel 12 and the intermediate flash system (vessels 15 and 16) were shut down during the transition. The catalyst flow to reactor 1 was stopped to allow the hydrocyclone and intermediate flash system to be flushed of all solids, and the catalyst flow was then restarted (feeding both reactor 1 and 2 in parallel). The total time for the product transition of this example was 22 to 24 hours.

Comparing examples 3 and 4, the process according to the invention results in significantly less transition time between product changes then the prior art saving at least 10 hours of off-specification and/or limited production. For example 3, there is no lost production as the catalyst feed was never cut significantly. Additionally, in the process of example 3, since the hydrocyclone and intermediate flash sections are never taken out of service, there is also significant savings for any subsequent transition from the non-differentiated "monomodal" production back to the differentiated "bimodal" production with reactors in series.

Example 5

For this example, the production of a non-differentiated monomodal polymer was repeated using the same process and conditions described in Example 2, then a product transition was completed to another non-differentiated monomodal polymer (having a different molecular weight distribution and melt-index) using the same process configuration as described in Example 2. For these non-differentiated monomodal grades, essentially the same copolymer was produced in each reactor zone (and the final product). The first product had an average MI2 of 3.5 and the comonomer content of 25 lb/klb or 2.5 wt %. The final product after transition had an MI2 of 6 and a comonomer content of 20 lb/klb or 2 wt %.

The same Zeigler-type catalyst was used to produce both products, and the final product was also produced at a rate of 20 kpph. For this product transition, the reactor temperature was kept constant, and the means to control final product molecular-weight distribution and melt-index was primarily through the hydrogen to ethylene ratio in the reactors.

As per example 2, the light gases from the top of vessel 12 travelled up through the fractionation column 15 where the gases not condensed by the overhead condenser 16 were removed via line 17 part of which was sent on via line 20 to a gas chromatograph analyzer for measurements used in determining the reactor 1 ethylene and hydrogen compositions. Also, as per Example 2, part of the recirculation polymer suspension upstream of line 14 was removed periodically and sent to the polymer sample filter 22 via line 21 from where a sample of polymer (A) was manually removed every 2 to 4 hours and its properties measured for quality control purposes. The above sampling systems were kept in service during the entire transition and the information from the polymer and light-gas analysis were directly used to change the ethylene and hydrogen flowrates entering reactor 1. Since there is typically only about ½ hour total polymer residence time in the light-gas removal system, any changes in the reactor 1 conditions were fairly quickly manifested in the above samples. As per typical prior art processes, the feed flows to reactor 2 were also varied based on sampling of the final product off of line 26, and the gas sampling off of the line between the flash vessel(s) 25 and the recycle compressor(s) 27. The total time for the complete product transition of this example was 8 to 10 hours.

Example 6

For comparison to a prior art process, the product change from one non-differentiated monomodal-grade polymer to another non-differentiated monomodal-grade polymer as described in Example 5 was repeated, but with a process configuration that does not have any means to sample the polymer or light gases between the two reactors. In this prior art process configuration for non-differentiated monomodal grade production that is not according to the invention, there is typically a simple slurry transfer line between the reactor 1 and the reactor 2. The same Zeigler-type catalyst was used to produce both products, and the final product was also produced at a rate of 20 kpph. For this product transition, the reactor temperature was kept constant, and the means to control final product molecular-weight distribution and melt-index was primarily through the hydrogen to ethylene ratio in the reactors.

For the product transition of this example, the feed flows to reactor 2 were varied based on sampling of the final product off of line 26, and the gas sampling off of the line between the flash vessel(s) 25 and the recycle compressor(s) 27. Since there was no ability to sample the light gases and the polymer leaving the reactor 1, its conditions were not measured, and had to be estimated based on the samples of light-gas and final product leaving reactor 2. To avoid overshooting the final product properties during the transition or reaching undesirable conditions that would have led to reactor pluggage, the ethylene and hydrogen flowrates fed to reactor 1 had to be controlled in a very conservative manner, and were essentially varied only in a direct proportion to the ethylene and hydrogen flowrates fed to reactor 2. Since there is typically 4 hours of residence time between the outlet of the reactor 1 and the sampling systems for reactor 2, any changes in reactor 1 conditions were not quickly manifested in the samples of light gas and final product polymer. The total time for the product transition of this example was 12 to 14 hours.

Comparing examples 5 and 6, the process according to the invention results in significantly less transition time between product changes then the prior art saving at least 4 hours of off-specification production. In the process of example 5, the more aggressive control of the key hydrogen and ethylene feed rates to the first reactor based on direct analysis of samples of the light-gas and polymer leaving the first reactor enables the final property targets to be achieved without under- or over-shooting, as compared to the prior art process of example 6 where there is no ability to sample the polymer or light gases from the first reactor.

What is claimed is:

1. A process to manufacture a differentiated and/or non-differentiated olefin polymer comprising the steps of:
   (a) providing at least one olefin for continuous polymerization in a first reactor in the presence of a diluent, hydrogen and a catalyst in order to produce a slurry effluent comprising the diluent and solid particles of a first olefin polymer;
   (b) introducing all of the slurry effluent from the first reactor comprising a suspension of particles of the first olefin polymer to a light gas removal system, wherein the light gas removal system consists of a flash vessel and a fractionation column with an overhead condenser that is directly connected to the vapor side of the flash vessel, wherein the overhead light gas vapors that are essentially free of polymer fines are produced in the overhead condenser, and wherein a slurry consisting of a suspension of particles of first olefin polymer that is free of light impurities is collected in the bottom of the flash vessel;
   (c) recovering the polymer-free overhead vapors without additional filtration from the light gas removal system and sending part of said recovered vapors to an analytical device capable of measuring light gas concentrations, where the recovered vapor is sent to an in-line gas chromatograph analyzer where at least one of the reaction components has a concentration that is measured and said reaction component has a feed flow to the first polymerization reactor that is adjusted based on the concentration measured;
   (d) adjusting the levels of hydrogen and olefin being provided to the first reactor based on the measured light gas concentrations so as to maintain the desired properties of the first olefin polymer;
   (e) pumping part of the suspension of particles of the first olefin polymer slurry collected in step (b) to a second polymerization reactor zone where at least one second olefin is polymerized in order to form a second olefin polymer and to produce a second olefin polymer suspension comprising diluent and particles of an olefin polymer composition comprising both the first olefin polymer and the second olefin polymer; and
   (f) withdrawing an olefin polymer suspension containing a differentiated or non-differentiated olefin polymer composition from the second polymerization reactor.

2. A process according to claim 1, wherein the second olefin polymer suspension of step (e) additionally undergoes the following steps prior to the differentiated or non-differentiated olefin polymer composition being withdrawn:
   (i) sending the second olefin polymer suspension to one or more flash vessel(s) which operate at from about 50 to about 550 pound-force per square inch gauge less than the pressure within the second reactor zone, and wherein the pressure within at least one of said flash vessel(s) is less than 20 pound-force per square inch gauge to separate overhead vapors of hydrocarbon gases from the second olefin polymer suspension;
   (ii) compressing the overhead hydrocarbon gases containing diluent, comonomer, and other reaction components from the overhead vapor to greater than 190 pound-force per square inch gauge;
   (iii) sending at least part of the compressed hydrocarbon gases into two fractionation columns wherein both columns are operating at pressures of greater than 190 pound-force per square inch and wherein the first column operates at a pressure of at least 5 pound-force per square inch greater than the pressure of the second column and in the absence of pressure-increasing equipment between the columns;
   (iv) separating out a comonomer-rich diluent stream in the first column and recycling part of the comonomer-rich diluent stream to the flash vessel of the light gas removal system of step (b), while separating out a comonomer-lean diluent stream in the second column and recycling part of the comonomer-lean diluent stream to the first polymerization reactor zone, wherein the flowrate of the total comonomer-rich diluent stream is at least 10% greater than the total flowrate of the comonomer-lean diluent stream.

3. A process according to claim 2, for the manufacture of a non-differentiated olefin polymer where the two fractionation columns are configured in a pattern selected from the group consisting of in parallel or in series and the comonomer-rich diluent stream is withdrawn from the base of each individual column and recycled to one or more polymerization reactors.

4. A process according to claim 2 wherein the polymerization reactors are transitioned from the production of a differentiated olefin polymer composition to production of a non-differentiated olefin polymer composition using the following steps:
   a) changing hydrogen flow to provide a hydrogen to olefin ratio required for a non-differentiated olefin polymer in the first reactor;
   b) increasing pressure throughout in the light-gas removal system from about 5 pound-force per square inch gauge per 20 minutes to about 20 pound-force per square inch gauge per 20 minutes;
   c) simultaneously increasing the pressure within the second reactor to maintain a constant positive pressure differential between the discharge of the first reactor and the second reactor;
   d) changing the hydrogen flow to that used for a non-differentiated olefin polymer in the second reactor;
   d) changing the hydrogen flow to that used for a non-differentiated olefin polymer in the second reactor;
   e) changing valve connections between the compressed recycle gas of step (iii) and the two fractionation columns in order to change the configuration of the columns from series to parallel;
   f) adjusting comonomer flow rate in each reactor to that of non-differentiated product; and
   g) providing an ethylene stream having a flow rate to each reactor and adjusting the ethylene flow rate to each reactor to achieve an ethylene concentration required for the non-differentiated product within each reactor.

5. A process according to claim 4, wherein the transition from differentiated olefin polymer composition to a non-differentiated olefin polymer composition is accomplished in from about 8 to about 12 hours.

6. A process according to claim 1 wherein the second olefin polymer suspension in step (e) is pumped using at least two pumps in series providing a total head pressure of at least 250 pounds-force per square inch.

7. A process according to claim 4 wherein the step of changing hydrogen flow is completed in less than one minute.

8. A process according to claim 5, further comprising the step of sampling the polymer product from each reactor at a frequency of from about 2 to about 4 hours before adjusting the ethylene or hydrogen flow rates.

* * * * *